(12) United States Patent
Roh

(10) Patent No.: US 10,795,613 B2
(45) Date of Patent: Oct. 6, 2020

(54) CONVERGENCE MEMORY DEVICE AND OPERATION METHOD THEREOF

(71) Applicant: SK hynix Inc., Icheon (KR)

(72) Inventor: Wan-Jun Roh, Goyang (KR)

(73) Assignee: SK Hynix Inc., Icheon (KR)

( * ) Notice: Subject to any disclaimer, the term of this patent is extended or adjusted under 35 U.S.C. 154(b) by 42 days.

(21) Appl. No.: 16/159,479

(22) Filed: Oct. 12, 2018

(65) Prior Publication Data
US 2019/0258426 A1    Aug. 22, 2019

(30) Foreign Application Priority Data

Feb. 19, 2018    (KR) .................. 10-2018-0019212

(51) Int. Cl.
G06F 3/06    (2006.01)

(52) U.S. Cl.
CPC ............ G06F 3/0659 (2013.01); G06F 3/061 (2013.01); G06F 3/0656 (2013.01); G06F 3/0673 (2013.01)

(58) Field of Classification Search
CPC ........ G06F 13/16; G06F 3/061; G06F 3/0659; G06F 3/0673; G06F 3/0656

USPC ......................................................... 711/163
See application file for complete search history.

(56) References Cited

U.S. PATENT DOCUMENTS

| | | | |
|---|---|---|---|
| 9,183,917 B1 * | 11/2015 | Cho ..................... | G11C 11/406 |
| 9,524,771 B2 | 12/2016 | Sriramagiri et al. | |
| 2010/0106901 A1 * | 4/2010 | Higeta .................. | G06F 11/106 |
| | | | 711/106 |
| 2014/0281311 A1 | 9/2014 | Walker et al. | |
| 2015/0109871 A1 * | 4/2015 | Bains ................... | G06F 13/1636 |
| | | | 365/222 |
| 2017/0140810 A1 | 5/2017 | Choi et al. | |
| 2018/0182445 A1 * | 6/2018 | Lee .......................... | G11C 8/04 |

* cited by examiner

*Primary Examiner* — Hashem Farrokh (57) ABSTRACT

A convergence memory device includes a plurality of memories and a controller configured to control the plurality of memories. When an access request for accessing a storage region included in one or more of the memories is received, the controller determines whether the access request has been received a preset number of times or more within a refresh cycle. When the controller determines that the access request has been received the preset number of times or more, the controller postpones processing of the received access request.

19 Claims, 9 Drawing Sheets

| CMD | ADDR | VALID | DELAYED | Time |
|---|---|---|---|---|
| R | 111 | 1 | | |
| W | 222 | 1 | | |
| W | 333 | 1 | 1 | 5 |
| W | 444 | 0 | | |
| ... | ... | ... | ... | ... |
| ... | ... | ... | ... | ... |

CONVERGENCE MEMORY DEVICE AND OPERATION METHOD THEREOF

CROSS-REFERENCE TO RELATED APPLICATION

This application claims priority under 35 U.S.C. § 119 to Korean Patent Application No. 10-2018-0019212 filed on Feb. 19, 2018, which is incorporated herein by reference in its entirety.

BACKGROUND

1. Field

Embodiments relate to a convergence memory device and an operation method thereof.

2. Discussion of the Related Art

Data are becoming important assets in the fourth industrial revolution, and the demands for new technology in support of transferring and analyzing large-scale data at a high data rate are increasing. For example, as artificial intelligence, autonomous driving, robotic, health care, virtual reality (VR), augmented reality (AR), and smart home technologies spread, demands for servers or data centers are increasing.

A legacy data center includes resources for computing, networking, and storing data, in the same equipment. However, a future large-scale data center may construct resources individually and then logically restructure the resources. For example, in the large-scale data center, the resources may be modularized at the level of racks, and the modularized resources may be restructured and supplied according to the usage. Therefore, a converged storage or memory device, which can be used for the future large-scale data center, is demanded.

SUMMARY

Various embodiments are directed to a convergence memory device for protecting a memory in a memory blade installed in a server system or data processing system, and an operation method thereof.

In an embodiment, a convergence memory device may include: a plurality of memories; and a controller configured to control the plurality of memories, wherein when an access request for accessing a storage region included in one or more of the memories is received, the controller determines whether the access request has been received a preset number of times or more within a refresh cycle, and when the controller determines that the access request has been received the preset number of times or more, the controller postpones processing of the received access request.

In an embodiment, there is provided an operation method of a convergence memory device which includes a plurality of memories and a controller for managing the plurality of memories. The operation method may include: determining whether an access request for accessing a storage region included in one or more of the memories has been received a preset number of times or more within a refresh cycle when the access request is received; and postponing processing of the received access request when it is determined that the access request has been received the preset number of times or more.

DETAILED DESCRIPTION

Various embodiments will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present disclosure.

Figure 1:
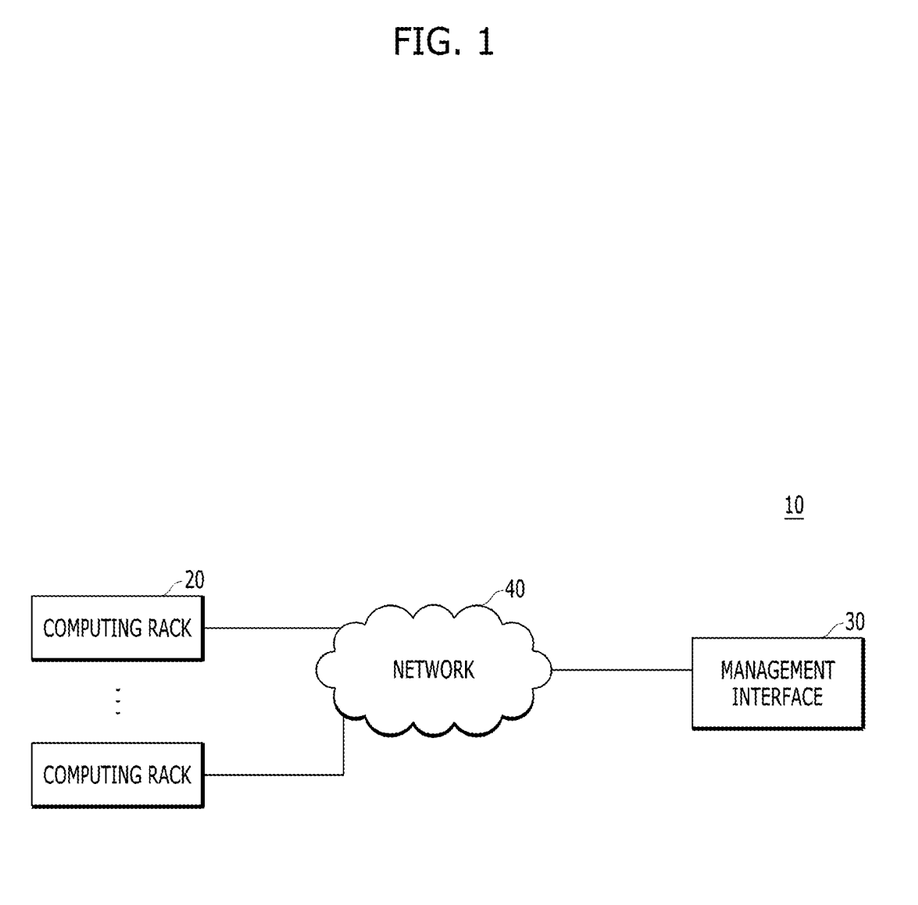
FIG. 1 is a block diagram illustrating a data processing system.

FIG. 1 is a block diagram illustrating a data processing system 10. Referring to FIG. 1, the data processing system 10 may include a plurality of computing racks 20, a management interface 30, and a network 40 for communication between the computing racks 20 and the management interface 30. The data processing system 10 having this rack-scale architecture may be used by a data center for processing large-scale data.

Each of the computing racks 20 may individually implement one computing device. Alternatively, each of the computing racks 20 may be combined with other computing racks to implement one computing device. The specific structures and operations of the computing racks 20 will be described later on.

The management interface 30 may provide an interactive interface for a user to control, administrate or manage the data processing system 10. The management interface 30 may be realized using an arbitrary type of a computing device that includes any of a computer, a multi-processor system, a server, a rack-mount server, a blade server, a lap-top computer, a notebook computer, a tablet computer, a wearable computing device, a network device, a web device, a distributed computing system, a processor-based system, a consumer electronic device, and so on.

According to some embodiments of the present disclosure, the management interface 30 may be realized by a distributed system having operation functions which may be performed by the computing racks 20 or having user interface functions which may be performed by the management interface 30. According to other embodiments of the present disclosure, the management interface 30 may be realized by a virtual cloud server that includes multi-computing devices distributed through the network 40. The management interface 30 may include a processor, an input/output subsystem, a memory, a data storage device, and a communication circuit.

The network 40 may transfer/receive data between the computing racks 20 and the management interface 30 and/or between the computing racks 20. The network 40 may be realized by an appropriate number of various wired and/or wireless networks. For example, the network 40 may include a publicly accessible global network, such as a wired or wireless Local Area Network (LAN), a Wide Area Network (WAN), a cellular network, and/or the Internet. In addition, the network 40 may include an appropriate number of auxiliary network devices, such as auxiliary computers, routers, and switches.

Figure 2:
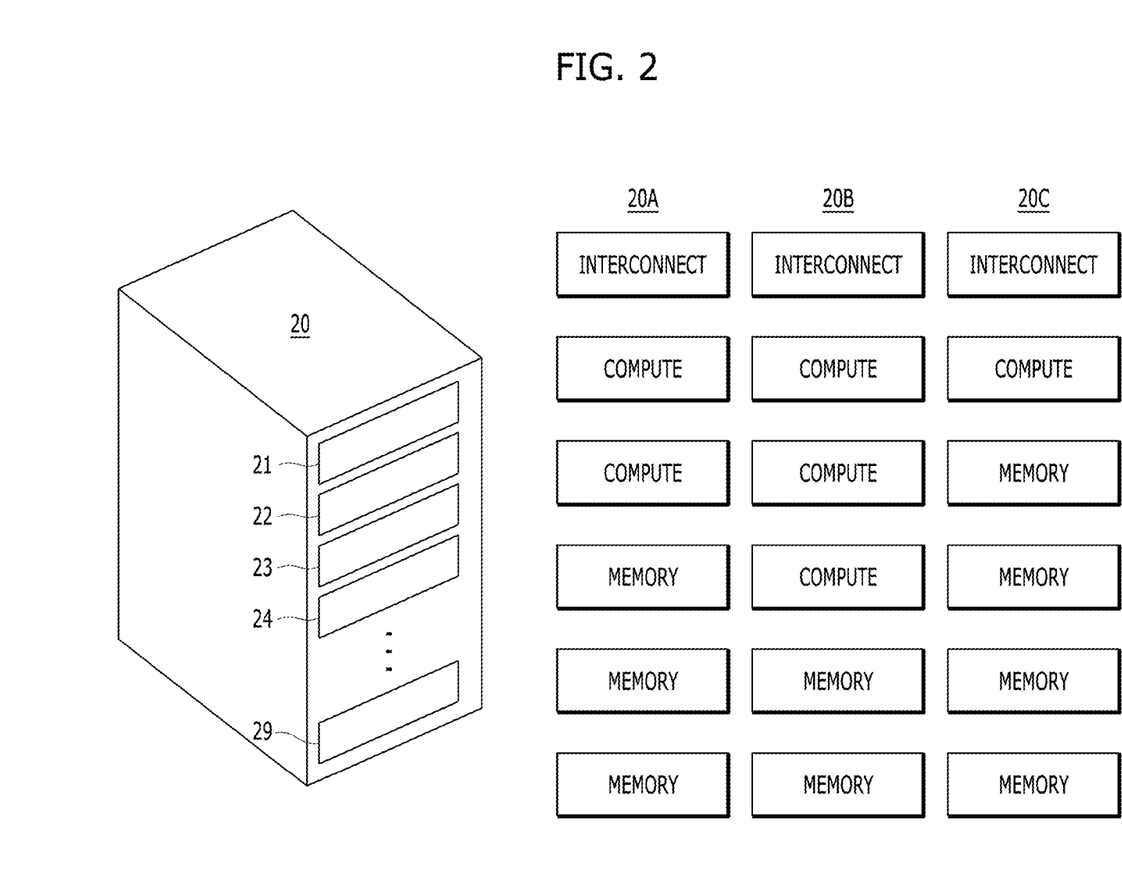
FIGS. 2 and 3 illustrate a computing device in accordance with an embodiment of the present disclosure.

FIG. 2 illustrates a computing device having a rack structure in accordance with an embodiment of the present disclosure.

Referring to FIG. 2, the computing rack 20 may include constituent elements in various forms, and structures, shapes, and names of the constituent elements are not limited. For example, the computing rack 20 may include a plurality of drawers 21 to 29. Each of the drawers 21 to 29 may include a plurality of modules, each of which may include a plurality of blades.

In various embodiments of the present disclosure, the computing rack 20 may be realized by a combination of appropriate numbers of compute blades, memory blades, and/or interconnect blades. Herein, it is defined that the computing rack 20 is realized by a combination of a plurality of blades, but the computing rack 20 may also be realized by diversely named elements such as drawers, modules, trays, boards, sashes, or units. The computing rack 20 may have a structure where the constituent elements of the computing rack 20 are disaggregated and classified according to their functions for the sake of convenience in realization. Although not limited, the computing rack 20 may have a structure of an interconnect blade, a compute blade, and a memory blade in a classification order from the top. The computing rack 20 and a computing device including the computing rack 20 may be referred to as 'a rack-scale system' or 'a disaggregated system.'

In an embodiment of the present disclosure, a computing device may be realized by one computing rack 20. In other embodiments, a computing device may be realized by all constituent elements of two or more computing racks 20, realized by some of constituent elements of two or more computing racks 20, or some of constituent elements of one computing rack 20.

In various embodiments of the present disclosure, a computing device may be realized by a combination of appropriate numbers of compute blades, memory blades, and interconnect blades that are included in the computing rack 20. As illustrated in FIG. 2, a computing rack 20A may include two compute blades, three memory blades, and one interconnect blade. A computing rack 20B may include three compute blades, two memory blades, and one interconnect blade. A computing rack 20C may include one compute blade, four memory blades, and one interconnect blade.

Although FIG. 2 illustrates a case where the computing rack 20 is realized by appropriate numbers of compute blades, memory blades, and interconnect blades, the computing rack 20 may include additional constituent elements that may be included in typical servers, such as a power system, a cooling system, an input/output device, and so on.

Figure 3:
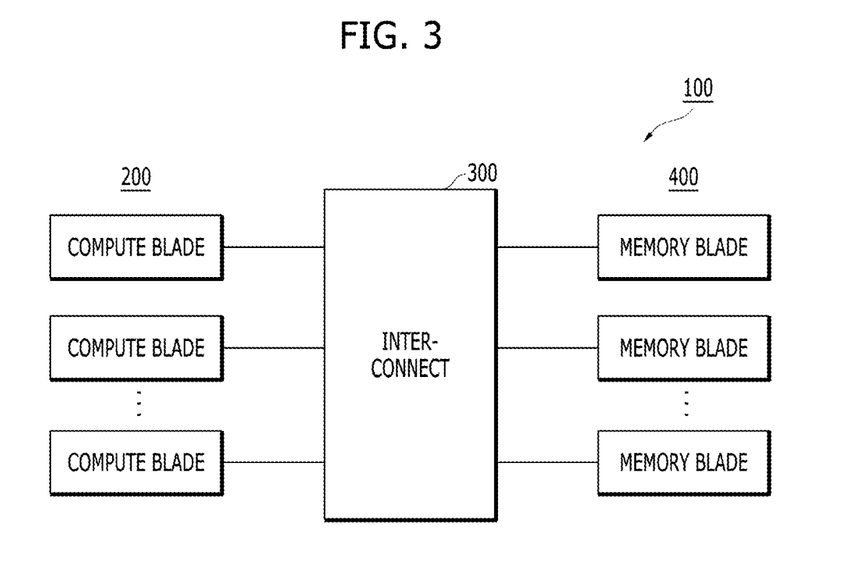

FIG. 3 illustrates a computing device 100 in accordance with an embodiment of the present disclosure.

Referring to FIG. 3, the computing device 100 may include a plurality of compute blades 200, a plurality of memory blades 400, and an interconnect blade 300. The compute blades 200 may be called pooled compute blades or pooled compute systems. Similarly, the memory blades may be called pooled memory blades or pooled memory systems. Herein, it is defined that the computing device 100 is realized by a combination of a plurality of blades, but the computing device 100 may also be realized by diversely named elements such as drawers, modules, trays, boards, sashes, or units.

Each of the compute blades 200 may include one or more of processing elements such as a processor, a processing/control circuit, a Central Processing Unit (CPU), and so on.

Each of the memory blades 400 may include one or more memories in various forms, such as volatile memories, non-volatile memories, or a combination thereof. For example, each of the memory blades 400 may include Dynamic Random Access Memories (DRAMs), flash memories, memory cards, hard disk drives (HDDs), solid state drives (SSDs), or a combination thereof.

Each of the memory blades 400 may be divided, allocated, or designated by and used by one or more processing elements that are included in each of the compute blades 200. Also, each of the memory blades 400 may store one or more operating systems (OS) that may be initialized and/or executed by the compute blades 200.

The interconnect blade 300 may include a communication circuit, a communication device, or a combination thereof, which may be divided, allocated or designated by and used by one or more processing elements included in each of the compute blades 200. For example, the interconnect blade 300 may be realized by an arbitrary number of network interface ports, interface cards, or interface switches. The interconnect blade 300 may use protocols related to one or more wired communication technologies for communication. For example, the interconnect blade 300 may support communication between the compute blades 200 and the memory blades 400 based on one or more of protocols such as PCIe (Peripheral Component Interconnect Express), QPI (QuickPath Interconnect), Ethernet, and the like.

Figure 4:
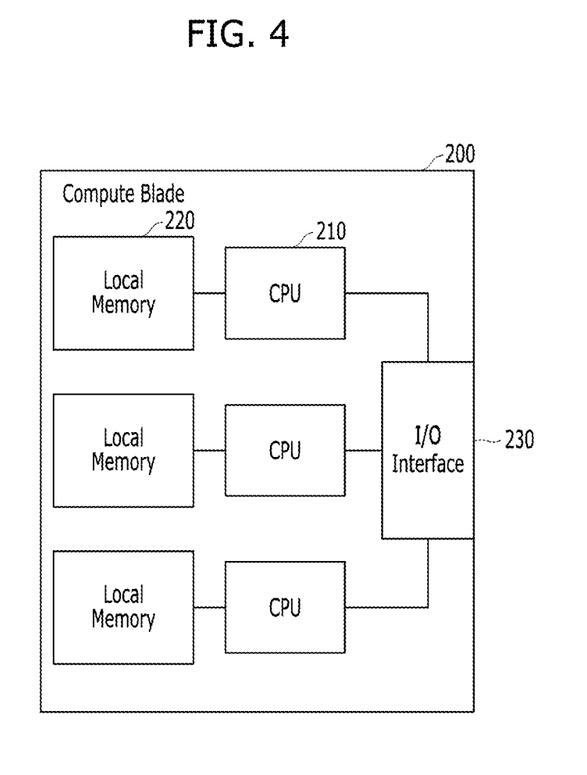
FIG. 4 is a block diagram illustrating a compute blade in accordance with an embodiment of the present disclosure.

FIG. 4 is a block diagram illustrating a compute blade 200 in accordance with an embodiment of the present disclosure.

Referring to FIG. 4, the compute blades 200 may include one or more Central Processing Units (CPUs) 210, one or more local memories 220, and an input/output (I/O) interface 230.

The CPUs 210 may divide, allocate, or designate one or more memory blades to be used, among the memory blades 400 illustrated in FIG. 3. Also, the CPUs 210 may initialize the one or more memory blades, and perform a data read operation and/or a data write (i.e., program) operation on the one or more memory blades.

The local memories 220 may store data to perform an operation of the CPUs 210. In various embodiments of the present disclosure, the local memories 220 may be a one-to-one correspondence with the CPUs 210.

The input/output interface 230 may support interfacing between the CPUs 210 and the memory blades 400 through the interconnect blade 300 of FIG. 3. The input/output interface 230 may use protocols related to one or more wired communication technologies, output and transfer data from the CPUs 210 to the interconnect blade 300, and receive data inputted from the interconnect blade 300 to the CPUs 210. For example, the input/output interface 230 may support communication between the CPUs 210 and the interconnect blade 300 using one or more of protocols such as PCIe (Peripheral Component Interconnect Express), QPI (Quick-Path Interconnect), Ethernet, and the like.

Figure 5A:
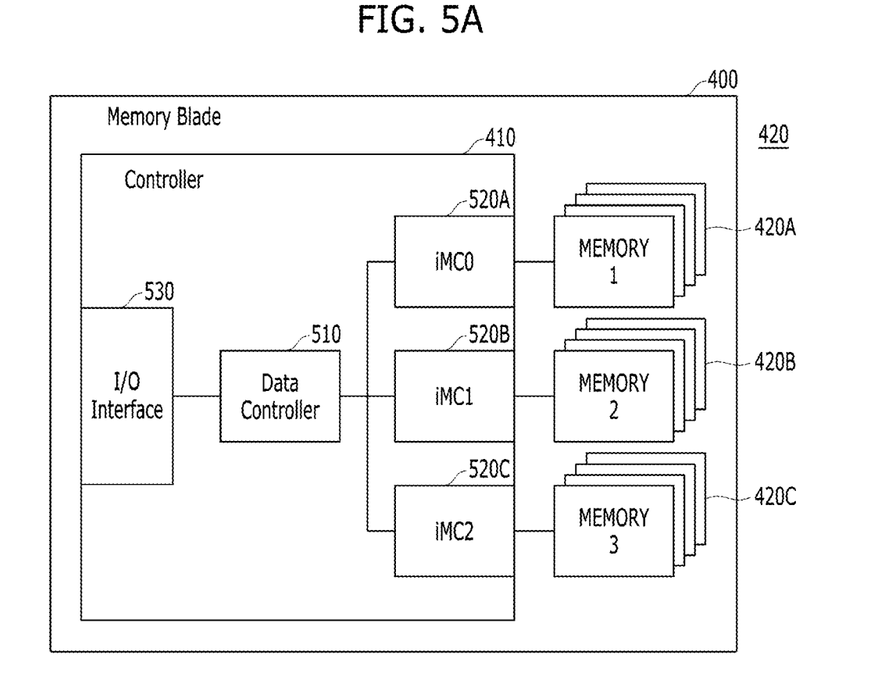
FIGS. 5A and 5B are block diagrams illustrating memory blades in accordance with embodiments of the present disclosure.
Figure 5B:
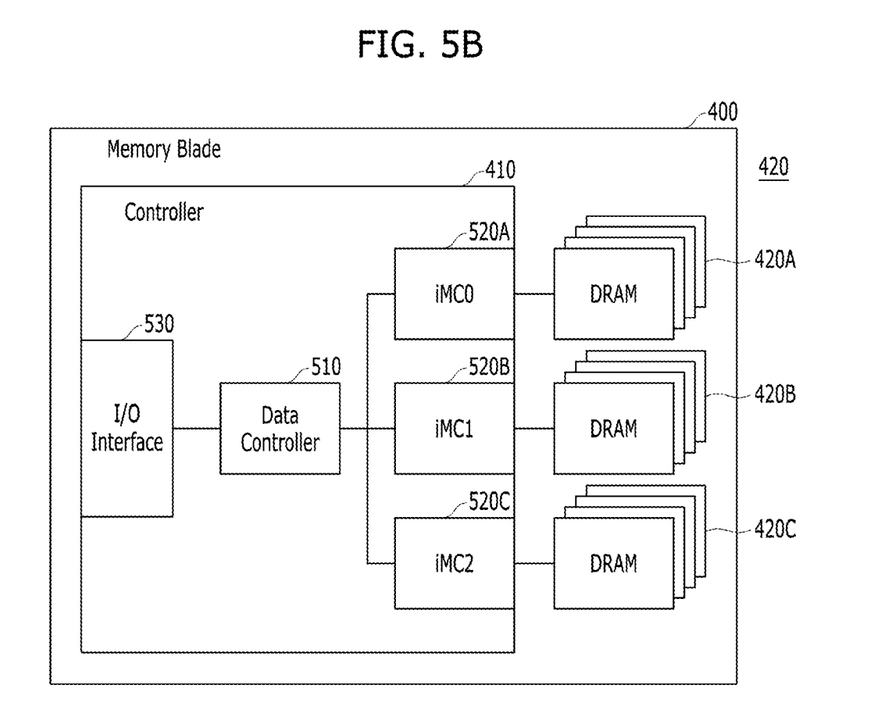

FIGS. 5A and 5B are block diagrams illustrating memory blades in accordance with embodiments of the present disclosure.

Referring to FIG. 5A, a memory blade 400 may include a controller 410 and a plurality of memories 420. The memories 420 may store (or write) data therein and output (or read out) stored data under the control of the controller 410. The memories 420 may include a first memory group 420A, a second memory group 420B, and a third memory group 420C. Each of the first, second, and third memory groups 420A, 420B, and 420C may include a multiplicity of memories. The first memory group 420A, the second memory group 420B, and the third memory group 420C may have the same characteristics or different characteristics. According to various embodiments of the present disclosure, the first memory group 420A, the second memory group 420B, and the third memory group 420C may include memories having the same characteristics or memories having different characteristics, in terms of capacity or latency.

Referring to FIG. 5B, the first memory group 420A, the second memory group 420B, and the third memory group 420C may include Dynamic Random Access Memories (DRAMs). Alternatively, the first memory group 420A, the second memory group 420B, and the third memory group 420C may include the same type of memories such as Static Random Access Memories (SRAMs) or flash memories. Also, the first memory group 420A, the second memory group 420B, and the third memory group 420C may include different types of memories.

Referring back to FIG. 5A, the controller 410 may include a data controller 510, memory controllers (MC) 520A to 520C, and an input/output (I/O) interface 530.

The data controller 510 may control data transferred and received between the memories 420 and the compute blades 200 of FIG. 3. For example, in response to a write request or command, the data controller 510 may receive write data from the compute blades 200 and control a write operation for writing the write data in a corresponding memory among the memories 420. In a read operation, in response to a read request or command, the data controller 510 may read out data stored in a particular memory among the memories 420 and control the read operation for outputting the read data to a corresponding compute blade among the compute blades 200.

The memory controllers 520A to 520C may be disposed between the data controller 510 and the memories 420, and may support interfacing between the data controller 510 and the memories 420. The memory controllers 520A to 520C may include a first memory controller (iMC0) 520A, a second memory controller (iMC1) 520B, and a third memory controller (iMC2) 520C that respectively correspond to the first memory group 420A, the second memory group 420B, and the third memory group 420C included in the memories 420. The first memory controller (iMC0) 520A may be disposed between the data controller 510 and the first memory group 420A, and may support data transfer/reception between the data controller 510 and the first memory group 420A. The second memory controller (iMC1) 520B may be disposed between the data controller 510 and the second memory group 420B, and may support data transfer/reception between the data controller 510 and the second memory group 420B. The third memory controller (iMC2) 520C may be disposed between the data controller 510 and the third memory group 420C, and may support data transfer/reception between the data controller 510 and the third memory group 420C. Although an example where the controller 410 includes three memory controllers, i.e., the first memory controller (iMC0) 520A, the second memory controller (iMC1) 520B, and the third memory controller (iMC2) 520C, is described herein, when the first memory group 420A, the second memory group 420B, and the third memory group 420C include DRAMs as illustrated in FIG. 5B, the controller 410 may include a single memory controller.

The input/output interface 530 may support interfacing between the data controller 510 and the compute blades 200 through the interconnect blade 300 of FIG. 3. The input/output interface 530 may use one or more protocols related to wired communication technologies, transfer read data from the data controller 510 to the interconnect blade 300, and transfer write data from the interconnect blade 300 to the data controller 510. For example, the input/output interface 530 may support communication between the data controller 510 and the interconnect blade 300 based on one or more of protocols such as Peripheral Component Interconnect Express (PCIe), QuickPath Interconnect (QPI), Ethernet, and the like.

As described above, a data processing system or a server system may have a structure in which a plurality of blades, e.g., compute blades, memory or storage blades, are mounted in a unit rack so as to be distinguished from each other. At this time, one memory blade may correspond to a convergence memory device or pooled memory in which a plurality of memories of the same kind or different kinds are integrated depending on a characteristic requirement.

In such a memory blade, a 'memory attack' may occur when a storage region of a specific memory is continuously accessed, regardless of whether the continuous accesses are malicious accesses or not. For example, as a specific target row of a DRAM is repeatedly or continuously accessed, a memory attack such as 'row hammer' or 'rowhammer' may occur, in which a bit flip occurs in a victim row, which is adjacent to the accessed target row. When a memory attack occurs, data of the victim row, which is adjacent to the target row, may be distorted. As a result, the data distortion may increase a risk of data insecurity.

Embodiments of the present disclosure provide a method for protecting a specific memory, such as a DRAM, from a memory attack, such as row hammer, in a system including a convergence memory device. In accordance with various embodiments, when a memory attack occurs, a convergence memory device may postpone processing of an access request for accessing the target storage region, which is also called an 'attacked storage region,' thereby removing a risk of data distortion in a victim storage region that is adjacent to the target storage region. The present embodiments may be applied to a DRAM, but not limited thereto. For example, the present embodiments may also be applied to a phase change RAM (PCRAM) in which a memory attack may occur within a specific cycle (for example, a refresh cycle) as in a DRAM.

Figure 6:
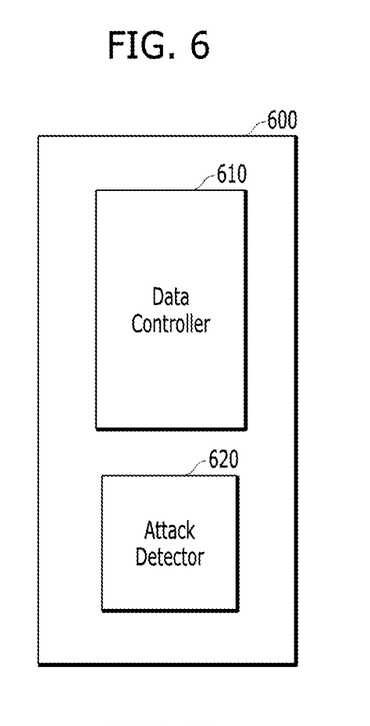
FIG. 6 illustrates a controller in accordance with an embodiment.

FIG. 6 illustrates a controller 600 in accordance with an embodiment. For example, the controller 600 may correspond to the controller 410 included in the memory blade 400 illustrated in any of FIGS. 5A and 5B.

Referring to FIG. 6, the controller 600 may include a data controller 610 and an attack detector 620. When an access request for accessing a target storage region, which is included in at least one memory among a plurality of memories (for example, the memories 420 illustrated in any of FIGS. 5A and 5B), is received, the attack detector 620 may detect whether the access request has been received a preset number of times or more within a refresh cycle tREFI (for example, 7.8 μs).

When the access request has been received the preset number of times or more, the attack detector 620 determines that the received access request corresponds to a memory attack, and the data controller 610 may postpone processing the access request. On the other hand, when the access request has been received fewer than the preset number of times, the attack detector 620 determines that the received access request does not correspond to the memory attack, and the data controller 610 may process the access request without delay.

When the attack detector 620 determines that the access request corresponds to the memory attack, the data controller 610 may postpone processing of the access request for accessing the target storage region until the refresh cycle ends, and then process the access request after the refresh cycle ends. When the access request is processed after the refresh cycle ends, it may indicate that a refresh operation has been already performed on a victim storage region that is adjacent to the target storage region. Therefore, a risk of the memory attack can be removed from the victim storage region. In other words, as the processing of the access request for accessing the target storage region is delayed (or cached) during up to the refresh cycle, the next refresh time for the victim storage region can be guaranteed even after the access request for accessing the attacked target storage region has been received.

Figure 7:
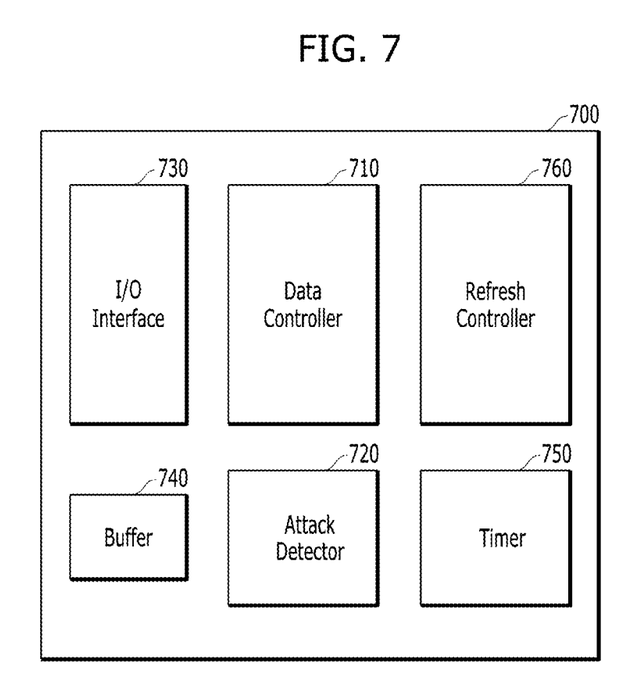
FIG. 7 illustrates a controller in accordance with an embodiment.

FIG. 7 illustrates a controller 700 in accordance with an embodiment. For example, the controller 700 may correspond to the controller 410 included in the memory blade 400 illustrated in any of FIGS. 5A and 5B.

Referring to FIG. 7, the controller 700 may include a data controller 710, an attack detector 720, an input/output (I/O) interface 730, a buffer 740, a timer 750, and a refresh controller 760.

The I/O interface 730 may receive an access request from an external device. For example, the I/O interface 730 may receive an access request for accessing at least one memory among a plurality of memories (for example, the memories 420 illustrated in any of FIGS. 5A and 5B) from a host such as the compute blade 200 illustrated in FIG. 4.

When an access request for accessing a target storage region included in at least one memory among the plurality of memories (for example, the memories 420 illustrated in any of FIGS. 5A and 5B) is received, the attack detector 720 may detect whether the access request has been received a preset number of times or more within a refresh cycle tREFI (for example, 7.8 μs). In various embodiments, the attack detector 720 may include a field programmable gate array (FPGA). The attack detector 720 including the FPGA can be variably used to implement memories in various manners.

When the access request has been received the preset number of times or more, the data controller 710 may postpone processing of the access request. On the other hand, when the access request has been received fewer than the preset number of times, the data controller 710 may process the access request without delay.

The buffer 740 may buffer (or cache) information associated with the target storage region corresponding to the access request that is to be processed by the data controller 710. The timer 750 may provide time information on whether the refresh cycle has elapsed and time information on the delayed access request, e.g., a time when the processing of the access request is postponed.

The refresh controller 760 may receive a refresh command from the data controller 710, and perform a refresh operation on a storage region of a corresponding memory in response to the refresh command. In various embodiments, the refresh controller 760 may be included in the memory controllers 520A to 520C illustrated in any of FIGS. 5A and 5B.

Specifically, when the attack detector 720 determines that the access request has been received the preset number of times or more, the data controller 710 may buffer the information associated with the target storage region corresponding to the access request into the buffer 740. When the access request is a write request, the buffer 740 may buffer the information associated with the target storage region, e.g., an address, a write command, and write data for the target storage region, and information on the delay of the access request. When the access request is a read request, the buffer 740 may buffer the information associated with the target storage region, e.g., an address and a read command, and the information on the delay of the access request.

In response to the end of the refresh cycle, the data controller 710 may generate a refresh command for at least one storage region that is adjacent to the target storage region or a refresh command for the target storage region. The refresh controller 760 may refresh the adjacent storage region or the target storage region in response to the refresh command.

After the refresh cycle ends, the data controller 710 may read the information associated with the target storage region buffered in the buffer 740, and process the delayed access request. For example, when the timer 750 indicates the end of the refresh cycle, the data controller 710 may flush the write data buffered in the buffer 740 to the target storage region.

When the buffer 740 is full of information and/or data even before the refresh cycle ends, the data controller 710 may generate a refresh command for at least one storage region adjacent to the target storage region. The refresh controller 760 may refresh the adjacent storage region in response to the refresh command.

When the attack detector 720 determines that the received access request corresponds to a memory attack, the data controller 710 may postpone processing of the received access request until the refresh cycle ends, and then process the received access request after the refresh cycle ends. When the received access request is processed after the refresh cycle ends, it may indicate that a refresh operation for the storage region adjacent to the target storage region has been already performed. Therefore, a risk of the memory attack can be removed.

Figure 8:
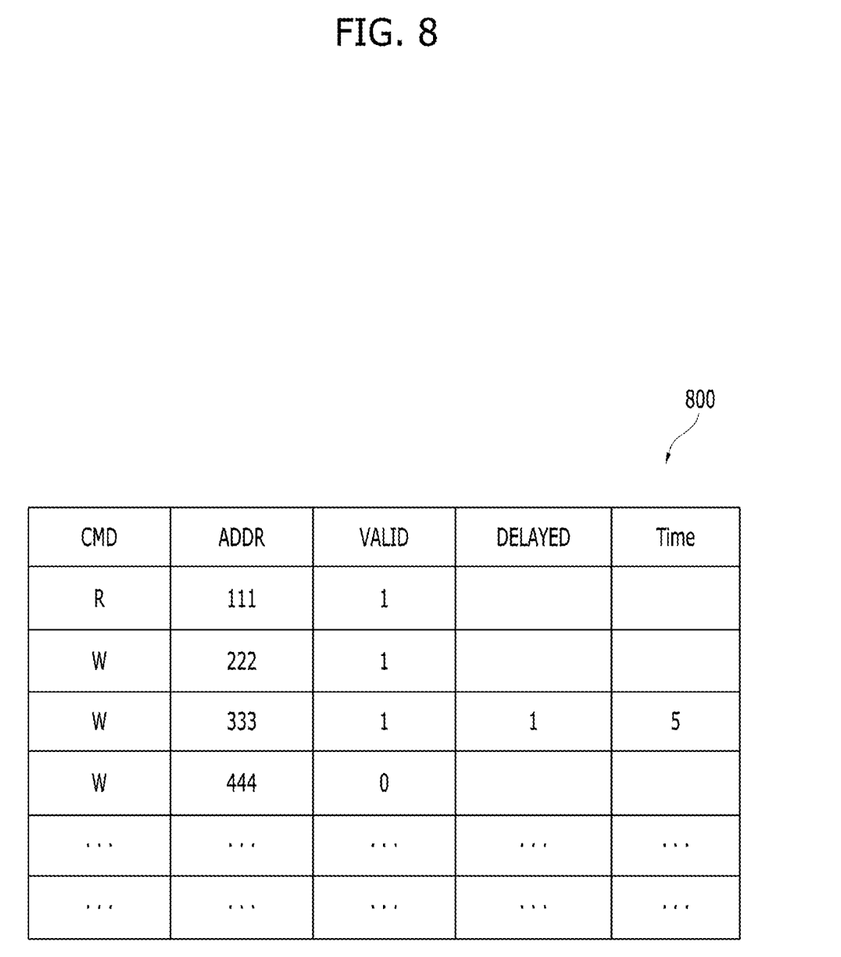
FIG. 8 illustrates a buffer in accordance with an embodiment.

FIG. 8 illustrates a buffer 800 in accordance with an embodiment. For example, the buffer 800 may correspond to the buffer 740 illustrated in FIG. 7.

Referring to FIG. 8, the buffer 800 may include a CMD region, an ADDR region, a VALID region, a DELAYED region, and a Time region. The CMD region is a region for storing a command corresponding to an access request. The CMD region may be used to store a write command W corresponding to a write request or a read command R corresponding to a read request for at least one memory among the memories 420 of any of FIGS. 5A and 5B. The ADDR region is a region for storing an address (for example, 111, 222, 333, or 444) for accessing a target storage region of a memory corresponding to the access request. For example, when the memory corresponding to the access request is a DRAM, the ADDR region may be used to store an address for accessing a row region of the memory.

The VALID region is a region for storing information on whether data was flushed to the target storage region of the memory according to the access request. For example, "1" in the VALID region may indicate that information stored in the buffer 800 is valid because data in the buffer 800 was not flushed, and "0" in the VALID region may indicate that the information stored in the buffer 800 is invalid because the data in the buffer 800 was flushed. The DELAYED region is a region for storing information on whether the processing of the access request was delayed. The Time region is a region for storing information on a time when the processing of the access request is postponed.

For example, when a write request for an address "333" of a target storage region of a memory is received, the data controller 710 of FIG. 7 may control the attack detector 720 to determine that the address "333" corresponding to the received write request indicates an attacked target storage region. When it is determined that the address "333" indicates the attacked target storage region, the data controller 710 may store the address "333" in the ADDR region and store a write command "W" for the target storage region in the CMD region. The data controller 710 may delay processing of the write request, and store information indicating the delayed write request in the DELAYED region and store information on the delay time in the Time region. Although not illustrated in FIG. 8, the buffer 800 may store write data corresponding to the delayed write request.

When the refresh cycle ends, the data controller 710 may flush data for the delayed access request to the target storage region of the memory, and update the buffer 800. For example, when the refresh cycle ends, the data controller 710 may flush data corresponding to a write request for an address "444" to a storage region corresponding to the address "444," and update a corresponding VALID region of the buffer 800 to "0." As such, a list of attacked target storage regions, stored in the buffer 800, may be maintained during a refresh cycle, and adjacent victim storage regions that are adjacent to the attacked storage regions may be refreshed during the refresh cycle.

Figure 9:
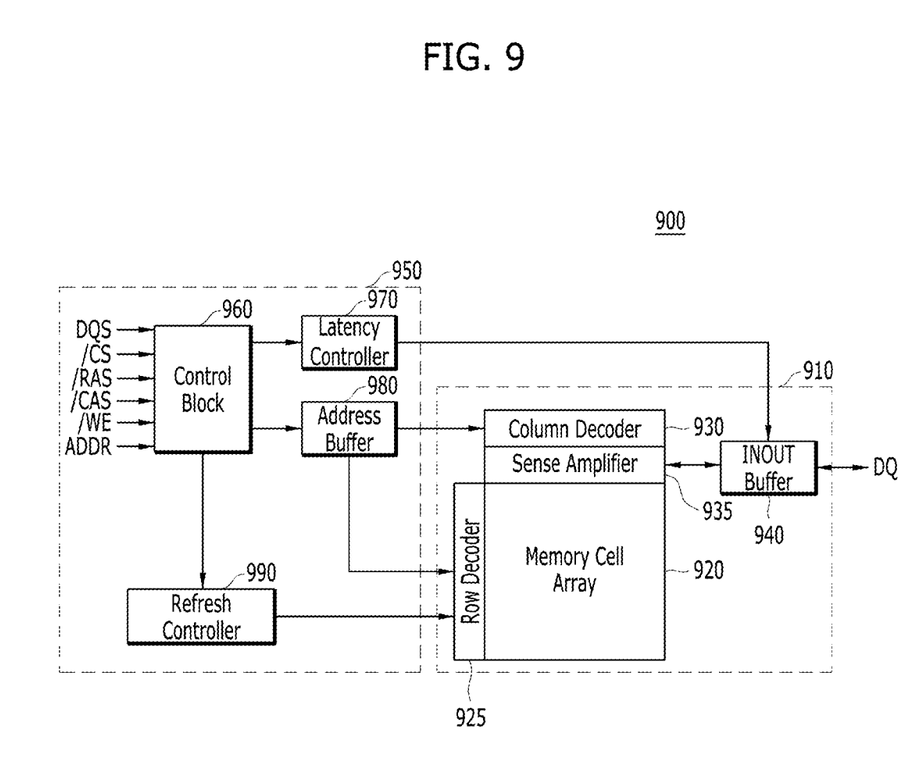
FIG. 9 illustrates a memory blade in accordance with an embodiment.

FIG. 9 illustrates a memory blade 900 in accordance with an embodiment.

Referring to FIG. 9, the memory blade 900 may include a memory 910 and a controller 950. FIG. 9 illustrates that the memory 910 is a DRAM. However, an operation in accordance with the present embodiment can also be applied to a PCRAM. The PCRAM may be analogous to the DRAM, because a memory attack may also occur in the PCRAM, and a refresh operation can also be performed on the PCRAM.

The memory 910 may include a memory cell array 920, a row decoder 925, a column decoder 930, a sense amplifier 935, and an INOUT buffer 940.

The memory cell array 920 may include a plurality of memory cells arranged at respective intersection regions between a plurality of word lines and a plurality of bit lines. The row decoder 925 may provide a row address to access the memory cell array 920, and may select one or more of the plurality of word lines included in the memory cell array 920 using the row address. The column decoder 930 may provide a column address to access the memory cell array 920, and select one or more of the plurality of bit line pairs included in the memory cell array 920 using the column address.

Each of the memory cells may be selected by a corresponding word line, and data of the selected memory cell may be transmitted to the sense amplifier 935 through a corresponding bit line. The sense amplifier 935 may sense data of memory cells corresponding to a row selected from the memory cell array 920, amplify the sensed data through the corresponding bit lines, and output the amplified data to the INOUT buffer 940. The sense amplifier 935 may write data received from the INOUT buffer 940 in memory cells corresponding to a selected row in the memory cell array 920. The INOUT buffer 940 may receive write data, in the form of a so-called DQ signal, from an external device through a data pad DQ, and output read data transmitted from the memory cell array 920 to the external device through the data pad DQ. The INOUT buffer 940 may be coupled to the external device, e.g., the memory controllers 520A to 520C illustrated in any of FIGS. 5A and 5B, through the data pad DQ.

The controller 950 may include a control block 960, a latency controller 970, an address buffer 980, and a refresh controller 990. The controller 950, the control block 960, and the refresh controller 990 may correspond to the controller 700, the data controller 710, and the refresh controller 760, respectively, which are illustrated in FIG. 7. In various embodiments, the latency controller 970, the address buffer 980, and the refresh controller 990 may be included in the memory controllers 520A to 520C illustrated in any of FIGS. 5A and 5B.

The control block 960 may control the latency controller 970, the address buffer 980, and the refresh controller 990. The control block 960 may receive various signals ADDR, /WE, /CAS, /RAS, /CS, DQ, and DQS from a host, such as the compute blade 200 illustrated in FIG. 4. The signal ADDR may indicate an address signal, which includes a row address and a column address for accessing the memory cell array 920. The signal /WE may indicate a signal for enabling a write operation on the memory cell array 920. The control signal /CAS may indicate a column address strobe signal. The control signal /RAS may indicate a row address strobe signal. The control signal /CS may indicate a signal for selecting the memory 910. The signal DQ (Data Queue) may indicate a data containing signal. The signal DQS may indicate a signal for strobing the signal DQ.

The control block 960 may adjust, using the latency controller 970, so-called AC parameters to perform an operation on the memory 910 according to a timing defined in particular specifications, e.g., specifications that have been determined by the joint electron device engineering council (JEDEC). For example, the AC parameters may include a RAS-to-CAS delay time (tRCD) and a write recovery time (tWR). The latency controller 970 may receive CAS latency from the control block 960. The latency controller 970 may transmit read latency to the INOUT buffer 940, such that the INOUT buffer 940 outputs data at an appropriate point of time. The INOUT buffer 940 may transmit the data to the memory cell array 920 through the sense amplifier 935 while the read latency is enabled. That is, the latency controller 970 may control the INOUT buffer 940 to adjust the tRCD or tWR for the memory 910. The latency controller 970 may control the INOUT buffer 940 to adjust a setup and hold time margin of the DQ or DQS signal.

The refresh controller 990 may control a refresh operation on the memory 910. The refresh controller 990 may perform a refresh operation on a corresponding storage region in response to a refresh command provided from the control block 960. In various embodiments, when a refresh cycle ends, the refresh controller 990 may perform a refresh operation on a target storage region of the memory cell array 920 that corresponds to a delayed access request, or a storage region that is adjacent to the target storage region, in response to the refresh command provided from the control block 960. Furthermore, although a refresh cycle has not ended, the refresh controller 990 may perform a refresh operation on the target storage region of the memory cell array 920 in response to the refresh command provided from the control block 960.

Figure 10:
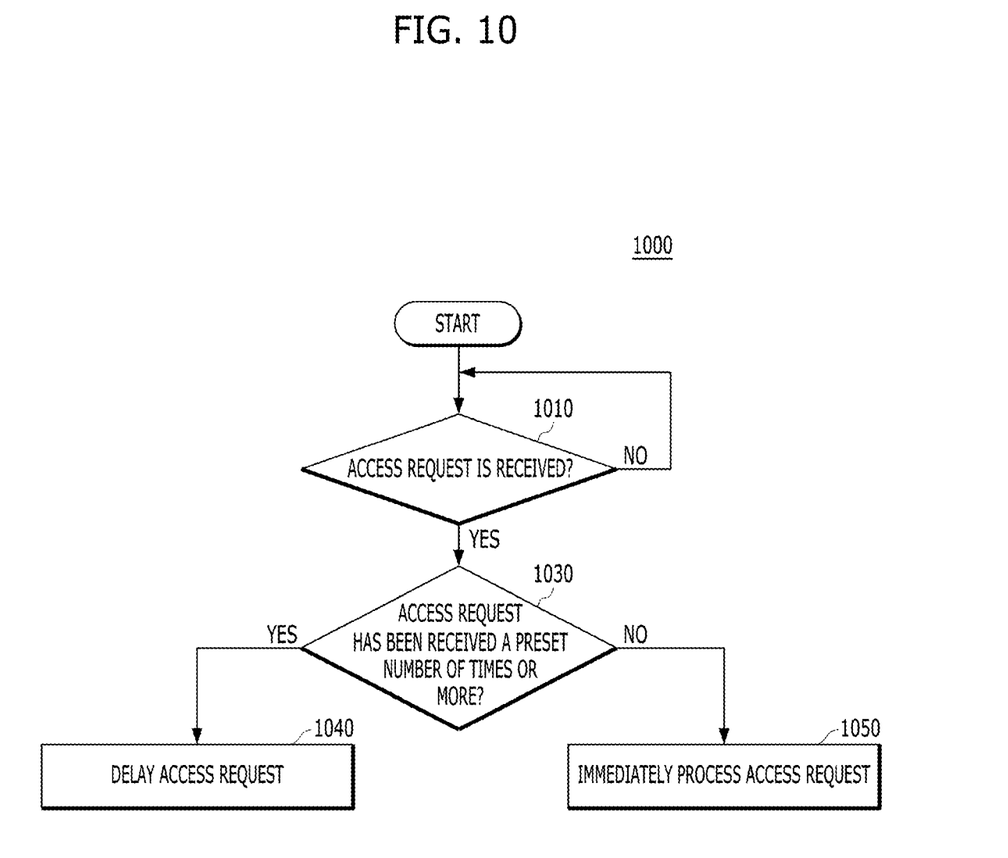
FIG. 10 illustrates an operation of processing an access request in accordance with an embodiment.

FIG. 10 illustrates an operation 1000 of processing an access request for a memory blade in accordance with an embodiment. The operation 1000 illustrated in FIG. 10 may be performed by the controller 700 illustrated in FIG. 7.

Referring to FIG. 10, the controller 700 may determine whether an access request for accessing a target storage region, which is included in at least one memory among a plurality of memories (for example, the memories 420 of any of FIGS. 5A and 5B), is received through the I/O interface 730, at step 1010.

When it is determined that the access request is received, the controller 700 may control the attack detector 720 to determine whether the access request has been received a preset number of times or more within a refresh cycle, at step 1030.

When it is determined that the access request has been received the preset number of times or more, the controller 700 may delay the processing of the received access request at step 1040. On the other hand, when the access request has been received fewer than the preset number of times, the data controller 610 may process the received access request without delay at step 1050.

Figure 11:
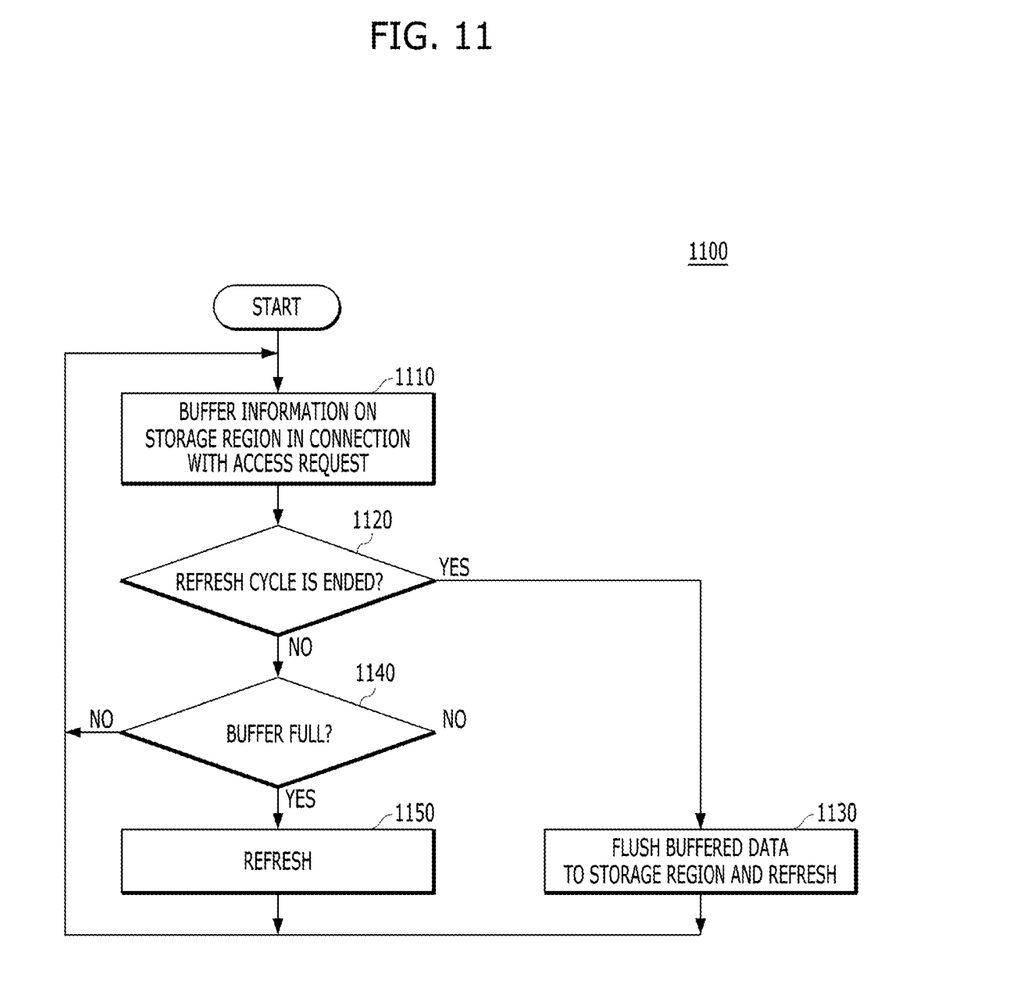
FIG. 11 illustrates a delay operation for an access request by a memory blade in accordance with an embodiment.

FIG. 11 illustrates a delay operation 1100 for an access request that is performed by a memory blade in accordance with an embodiment. The delay operation 1100 illustrated in FIG. 11 may be performed by the controller 700 illustrated in FIG. 7, which is included in a memory blade. The delay operation 1100 may be performed when an access request for accessing a target storage region included in a memory among a plurality of memories in the memory blade has been received by the memory blade a preset number of times or more within a refresh cycle.

Referring to FIG. 11, the data controller 710 of the controller 700 may buffer information on the target storage region into the buffer 740, at step 1110. For example, when the access request is a write request, the data controller 710 may buffer an address, a write command, and write data for the target storage region into the buffer 740, and may buffer information on whether processing of the access request is delayed or not into the buffer 740. For another example, when the access request is a read request, the data controller 710 may buffer an address and a read command for the target storage region into the buffer 740, and may buffer information on whether processing of the access request is delayed or not into the buffer 740.

When it is determined that the refresh cycle has ended (YES at step 1120), the data controller 710 may flush the write data buffered in the buffer 740 to the target storage region at step 1130. Furthermore, the data controller 710 may generate a refresh command for the target storage region or a refresh command for another storage region that is adjacent to the target storage region. In response to the refresh command, the refresh controller 760 may perform a refresh operation on the target storage region or the adjacent storage region. When such a refresh operation is performed, the data controller 710 may remove the information on the target storage region from the buffer 740.

Even if it is determined that the refresh cycle has not ended (NO at step 1120) or if it is determined that the buffer 740 is full of information and/or data (YES at step 1140), the data controller 710 may generate a refresh command for at least one storage region that is adjacent to the target storage region of the memory. In response to the refresh command, the refresh controller 760 may perform a refresh operation on the adjacent storage region at step 1150.

As described above, the present embodiments can delay processing of an access request for accessing a target storage region when a memory attack, such as row hammer, occurs in a specific memory included in a convergence memory device, such as a memory blade, thereby removing a risk of data distortion in a victim storage region that is adjacent to the target storage region.

Although various embodiments have been described for illustrative purposes, it will be apparent to those skilled in the art that various changes and modifications may be made without departing from the spirit and scope of the invention as defined in the following claims.

What is claimed is:

1. A convergence memory device, comprising:
a plurality of memories; and
a controller configured to control the plurality of memories,
wherein when an access request for accessing a storage region included in one or more of the memories is received, the controller determines whether the access request has been received a preset number of times or more within a refresh cycle,
wherein when the controller determines that the access request has been received the preset number of times or more, the controller postpones processing of the received access request, and
wherein the controller further comprises a buffer configured to buffer, when the access request is a write request, an address for the storage region, a write command for the storage region, write data for the storage region, and information on the delayed processing of the received access request.

2. The convergence memory device of claim 1, wherein when the controller determines that the access request has been received fewer than the preset number of times, the data controller processes the received access request without delay.

3. The convergence memory device of claim 2, wherein the data controller delays the processing of the received access request when the access request has been received the preset number of times or more, and processes the delayed access request when the refresh cycle ends.

4. The convergence memory device of claim 3, wherein the access request comprises one or both of a write request to write data in the storage region and a read request to read data from the storage region.

5. The convergence memory device of claim 4, wherein the one or more memories comprise one or more of a dynamic random access memory (DRAM) and a phase change RAM (PCRAM).

6. The convergence memory device of claim 5, wherein the storage region comprises a first row region corresponding to a row, and
the controller generates a refresh command for one or more second row regions adjacent to the first row region when the refresh cycle ends.

7. The convergence memory device of claim 6, further comprising a refresh controller configured to perform a refresh operation on the one or more second row regions in response to the refresh command.

8. The convergence memory device of claim 7, wherein the controller further comprises a buffer configured to buffer, when the access request is a read request, the address for the storage region, a read command for the storage region, and the information on the delayed processing of the received access request.

9. The convergence memory device of claim 6, wherein the controller generates a refresh command for the one or more second row regions adjacent to the first row region when the buffer is full of information and/or data.

10. The convergence memory device of claim 1, wherein the controller comprises:
   a detector configured to determine whether the access request has been received the preset number of times or more within the refresh cycle; and
   a data controller including the buffer and configured to postpone the processing of the received access request when the access request has been received the preset number of times or more.

11. The convergence memory device of claim 10, wherein the controller further comprises an input/output (I/O) interface configured to receive the access request.

12. The convergence memory device of claim 1, wherein the controller flushes the write data buffered in the buffer to the storage region when the refresh cycle ends.

13. An operation method of a convergence memory device, which includes a plurality of memories and a controller for controlling the plurality of memories, the operation method comprising:
   determining whether an access request for accessing a storage region included in one or more of the memories has been received a preset number of times or more within a refresh cycle when the access request is received; and
   postponing processing of the received access request when it is determined that the access request has been received the preset number of times or more,
   wherein the postponing the processing of the received access request comprises:
   delaying the processing of the received access request when the access request has been received the preset number of times or more; and
   processing the delayed access request when the refresh cycle ends, and
   wherein the delaying the processing of the received access request comprises:
   buffering, when the access request is a write request, an address for the storage region, a write command for the storage region, write data for the storage region, information on the delayed processing of the received access request.

14. The operation method of claim 13, further comprising processing the received access request without delay when it is determined that the access request has been received fewer than the preset number of times.

15. The operation method of claim 13, wherein the access request comprises one or both of a write request to write data in the storage region and a read request to read data from the storage region.

16. The operation method of claim 15, wherein the one or more memories comprise one or more of a dynamic random access memory (DRAM) and a phase change RAM (PCRAM),
   wherein the storage region comprises a row region corresponding to a row, and
   wherein the operation method further comprises refreshing one or more row regions that are adjacent to the row region when the refresh cycle ends.

17. The operation method of claim 16, wherein delaying the processing of the received access request further comprises:
   buffering, when the access request is a read request, the address for the storage region, a read command for the storage region, and the information on the delayed processing of the received access request.

18. The operation method of claim 16, further comprising:
   refreshing the one or more row regions when a buffer is full of information and/or data.

19. The operation method of claim 13, further comprising:
   flushing the buffered write data to the storage region when the refresh cycle ends.

* * * * *